S. S. JACKSON.
LET-BACK FOR TAKE-UP MECHANISM OF LOOMS.
APPLICATION FILED FEB. 27, 1913.
1,079,296.
Patented Nov. 18, 1913.
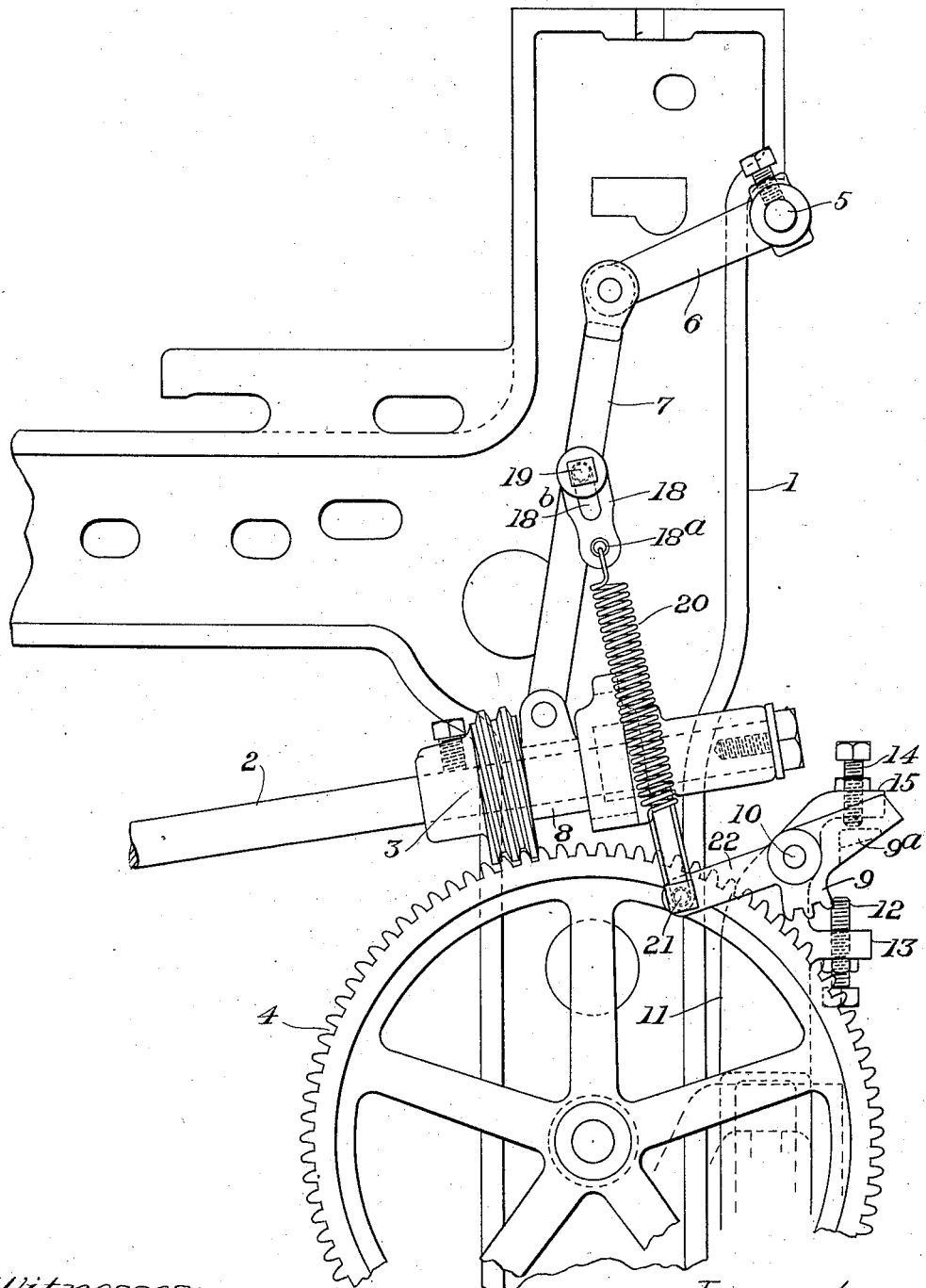
Witnesses:
Oscar F. Hill
Ellen O. Spring
Inventor:
Simeon S. Jackson
by Chas. F. Randall
Attorney.

UNITED STATES PATENT OFFICE.

SIMEON S. JACKSON, OF BOSTON, MASSACHUSETTS, ASSIGNOR TO THE STAFFORD COMPANY, OF READVILLE, BOSTON, MASSACHUSETTS, A CORPORATION OF NEW JERSEY.

LET-BACK FOR TAKE-UP MECHANISM OF LOOMS.

1,079,296. Specification of Letters Patent. Patented Nov. 18, 1913.

Application filed February 27, 1913. Serial No. 750,939.

*To all whom it may concern:*

Be it known that I, SIMEON S. JACKSON, a subject of Great Britain, residing at Readville, Boston, in the county of Suffolk, State of Massachusetts, have invented a certain new and useful Improvement in Let-Backs for Take-Up Mechanism of Looms, of which the following is a specification, reference being had therein to the accompanying drawing.

The invention consists in means for insuring engagement of the let-back dog or pawl of a loom take-up mechanism with the toothed wheel with which it coöperates, and thereby securing proper control of the extent of the letting-back.

The invention is designed to insure promptness and certainty in the engagement of the said dog with the said teeth.

The drawing shows in side elevation a portion of the frame of a loom, and certain portions of the take-up mechanism of a loom, including let-back devices having the invention applied thereto.

Having reference to the drawing,—1 is the loom-frame, 2 the actuating worm-shaft of the take-up mechanism, 3 the take-up worm, and 4 the worm-gear of the take-up mechanism. The said worm-gear is actuated as usual through the rotation of the worm-shaft and worm, to effect the taking up.

The drawing shows well-known means for lifting the worm out of engagement with the worm-wheel under the control of the weft-detector devices of the loom, for the purpose of disconnecting the taking-up temporarily when such devices act, as, for instance, in case of weft failure or breakage. Such means comprises the usual transverse shaft 5 mounted in bearings at the front of the loom-frame just below the breast-beam and rocked at times in the working of the loom through the agency of the weft-detector mechanism, the arm 6 fixed upon the said transverse shaft at one end of the latter, the connecting-link 7 having its upper end connected pivotally with said arm, and the collar 8 surrounding the worm-shaft just in front of the worm and having the lower end of the said connecting-link pivotally connected thereto. When the transverse shaft is rocked under the control of the weft-detector mechanism in well-known manner, such rocking of the said shaft serves through the arm, connecting-link, and collar to lift the worm-shaft so as to disengage the worm from the teeth of the worm-gear, thereby arresting the taking-up action and permitting the take-up mechanism to let back.

A well-known form of let-back dog is represented at 9. It is pivoted at 10 upon a fixed stand 11 in connection with the loom-frame, and furnished with teeth for engagement with those of the worm-gear. When the worm-gear is rotated forwardly in the regular taking-up operation, the teeth of the worm-gear act upon those of the let-back dog to swing the latter out of the way, so that the dog does not interfere with the forward turning movement of the worm-gear. When the worm-shaft and worm-gear are moved so as to disengage the worm from the worm-gear, the backward turning movement of the worm-gear which takes place as a part of the letting-back movement causes the teeth of the worm-gear to engage with those of the let-back dog so as to rock the said dog backward until a stop-projection 9ª upon the dog brings up against the acting end of an adjusting screw 12 fitted to a threaded opening tapped in the lug 13 of the stand supporting the dog. This contact of the stop of the dog with the adjusting screw arrests the backward turning movement of the dog, and thereby determines the extent of the letting-back movement of the take-up mechanism as will be understood. A second adjusting screw 14 applied to another lug 15 of the said stand limits the extent of the movement to which the let-back dog can swing forward under the action of the teeth of the forwardly rotating worm-gear, and causes such dog to remain in position close to the teeth of the worm-gear during the regular working, in readiness to engage quickly therewith in case of letting-back movement and consequent backward turning of the said worm-gear.

With the rear tooth of the let-back dog in contact with the point of one of the teeth of the worm-gear at the moment at which the worm is lifted out of mesh with the worm-gear it might happen, and sometimes has happened in practice, that a sudden recoil or backward turning movement of the worm-gear, especially if taken in connection with a sluggish movement of the let-back dog into engaging position, would cause a number of the teeth of the worm-gear to pass the let-back dog prior to engagement of the let-back dog with the teeth of the worm-gear. This means an excessive letting-back, and unless discovered by the weaver and corrected or compensated for by him, prior to the continuation of the weaving operation, would result in a thick place in the cloth being woven, and consequently in a defect in such cloth.

For the purpose of preventing the improper action to which reference has just been made, and the production of thick places thereby, I provide means for definite or positive, so to speak, actuation of the let-back dog into engagement with the teeth of the worm-gear at the time of the lifting of the worm out of mesh with the worm-gear. The said devices comprise a link 18 fastened by a bolt or clamp-screw 19 to the connecting-link 7 aforesaid, and a contracting spiral spring 20 having one end thereof engaged with the said link 18, and the other end thereof engaged with a headed pin or screw 21 carried by an arm 22 projecting from the let-back dog.

One end of the spring is hooked into a hole 18$^a$ in the link 18. The other end thereof has the wire formed into an elongated loop receiving the stem of the pin or screw 21. The combined length of the link 18, the spring in its contracted and relaxed state, and the said loop, is such that so long as the arm 6 and connecting-link 7 are in their normal lowered position with worm 3 in mesh with worm-gear 4, the let-back dog is permitted a sufficient amount of play to permit successive teeth of the worm-gear to first contact with the rear tooth of the dog and then pass such tooth, preferably without bringing the tension of the spring into play. To provide for a proper setting of the lower end of the link of the spring with relation to the pin or screw 21 of the let-back dog, the link 18 is formed with a longitudinal slot 18$^b$ receiving the stem of the bolt or clamp-screw 19. This enables the link 18 to be adjusted up or down with reference to the connecting-link 7, so as to dispose the lower end of the elongated loop of the spring properly with relation to pin or screw 21 of the let-back dog.

Heretofore the let-back dog has been held in readiness for engagement with the coöperating toothed wheel in what may be termed a purely negative manner, namely by gravity. My invention is characterized by providing for positive action, but in yielding manner, in causing the engagement of the let-back dog with the said wheel.

What is claimed as the invention is,—

1. In take-up mechanism for looms, the combination with letting-back devices including a let-back dog which coöperates with a wheel to control the extent of letting-back, of means for definite or positive actuation of said dog into engagement with said wheel at time of letting-back.

2. The combination with take-up mechanism including a wheel, and a let-back dog which coöperates with said wheel, of letting-back means operating to release said wheel for letting-back purposes, and a spring through which the movement of said letting-back means to occasion letting-back produces actuation of the said dog into engagement with the wheel to limit the extent of letting-back.

3. In take-up mechanism the combination with take-up gearing, letting-back devices operating to disconnect such gearing for the letting-back, and a let-back dog that coöperates with a rotatable wheel, of a spring through which the movement of said devices to disconnect the gearing actuates the said dog into engagement with the said wheel to control the extent of the letting-back.

4. In combination, take-up mechanism including a worm-drive, letting-back devices operating to operatively disconnect said drive for the letting-back, and a let-back dog that coöperates with a wheel of said mechanism, of means through which the movement of said devices to disconnect said drive actuates the said dog into engagement with the said wheel to control the extent of the letting-back.

5. In combination, take-up mechanism including a worm and worm-gear, letting-back devices whereby said worm is disengaged from said worm-gear for letting-back purposes, and means through which the movement of said devices to disengage said worm actuates the dog into engagement with said worm-gear to limit the extent of the letting-back.

6. In combination, a take-up worm and gear, a let-back dog which coöperates with said gear, a transverse shaft, and means connected therewith for lifting said worm out of mesh with the wheel driven thereby and also directly actuating said dog into engagement with the gear with which it coöperates.

7. In combination, a take-up worm and worm-gear, a let-back dog which coöperates with said worm-gear, a transverse shaft provided with an arm, means in connection with said arm for lifting said worm out of mesh with the worm-gear, and a spring through which the arm actuates the said dog into engagement with the worm-gear.

In testimony whereof I affix my signature in presence of two witnesses.

SIMEON S. JACKSON.

Witnesses:
NATHAN B. DAY,
CHAS. F. RANDALL.

---

Copies of this patent may be obtained for five cents each, by addressing the "Commissioner of Patents, Washington, D. C."